(12) United States Patent
Auerbach et al.

(10) Patent No.: US 12,006,024 B2
(45) Date of Patent: Jun. 11, 2024

(54) SYSTEMS AND METHODS FOR REDUNDANT FLIGHT CONTROL IN AN AIRCRAFT

(71) Applicant: BETA AIR, LLC, South Burlington, VT (US)

(72) Inventors: Joshua E. Auerbach, Waterbury Center, VT (US); Andrew Giroux, Georgia, VT (US); Chris Townsend, Shelburne, VT (US)

(73) Assignee: BETA AIR, LLC, South Burlington, VT (US)

(*) Notice: Subject to any disclaimer, the term of this patent is extended or adjusted under 35 U.S.C. 154(b) by 36 days.

(21) Appl. No.: 17/855,376

(22) Filed: Jun. 30, 2022

(65) Prior Publication Data

US 2023/0054141 A1 Feb. 23, 2023

Related U.S. Application Data

(63) Continuation of application No. 17/404,614, filed on Aug. 17, 2021, now Pat. No. 11,407,496.

(51) Int. Cl.
| | |
|---|---|
| *B64C 13/50* | (2006.01) |
| *B64C 9/00* | (2006.01) |
| *B64C 13/04* | (2006.01) |
| *B64D 27/24* | (2006.01) |

(52) U.S. Cl.
CPC .............. *B64C 13/505* (2018.01); *B64C 9/00* (2013.01); *B64C 13/04* (2013.01); *B64D 27/24* (2013.01); *B64C 2009/005* (2013.01)

(58) Field of Classification Search
CPC ......... B64C 13/505; B64C 9/00; B64C 13/04; B64C 2009/005
See application file for complete search history.

(56) References Cited

U.S. PATENT DOCUMENTS

| | | | | |
|---|---|---|---|---|
| 4,179,944 A | * | 12/1979 | Conner ................... | H02K 7/06 192/141 |
| 6,241,182 B1 | * | 6/2001 | Durandeau ........... | B64C 13/503 244/99.4 |
| 9,242,728 B2 | * | 1/2016 | Morrison ................ | B64C 27/32 |
| 2005/0151027 A1 | * | 7/2005 | Recksiek .............. | B64C 13/505 244/211 |
| 2009/0266939 A1 | * | 10/2009 | Hanlon ................... | B64C 13/46 244/223 |
| 2013/0192453 A1 | * | 8/2013 | Bonny .................... | F01B 25/00 91/1 |
| 2019/0078669 A1 | * | 3/2019 | Liu .......................... | F16H 21/12 |
| 2020/0086973 A1 | * | 3/2020 | Healy ....................... | B64C 3/10 |

* cited by examiner

*Primary Examiner* — Rodney A Bonnette
(74) *Attorney, Agent, or Firm* — Lee & Hayes, P.C.

(57) ABSTRACT

The present invention is directed to systems and methods for redundant flight control configured for use in an aircraft. More specifically, a system is provided that includes a plurality of actuators that are configured to move a flight component of an aircraft such that one actuator is configured to move the flight component if the other actuator fails to move the flight component upon receipt of an attitude command from a pilot control.

20 Claims, 10 Drawing Sheets

SYSTEMS AND METHODS FOR REDUNDANT FLIGHT CONTROL IN AN AIRCRAFT

CROSS-REFERENCE TO RELATED APPLICATIONS

This application is a continuation of Nonprovisional application Ser. No. 17/404,614, filed on Aug. 17, 2021, and entitled "SYSTEMS AND METHODS FOR REDUNDANT FLIGHT CONTROL IN AN AIRCRAFT," the entirety of which is incorporated herein by reference.

FIELD OF THE INVENTION

The present invention generally relates to the field of aircrafts. In particular, the present invention is directed to systems and methods for redundant flight control configured for use in an aircraft.

BACKGROUND

In the operation of aircrafts, it is essential for all components of the aircraft to remain fully functional in order for the aircraft to safely take off, maneuver, and land. During some flights, a component of the aircraft may experience a malfunction or failure, which will put the aircraft in an unsafe mode and compromise the safety of the aircraft, passengers, and onboard cargo.

SUMMARY OF THE DISCLOSURE

In an aspect, a system for redundant flight control is provided. The system includes an aerodynamic surface of an electric aircraft, wherein the aerodynamic surface is configured to adjust an attitude of the electric aircraft. The system includes a plurality of actuators comprising a first actuator and a second actuator, wherein each of the first actuator and the second actuator comprises at least an electric motor configured to convert an electrical signal into a mechanical movement of the aerodynamic surface, wherein, if the first actuator is disabled, the second actuator is configured to move the aerodynamic surface of the electric aircraft. The system includes a pilot control communicatively connected to the plurality of actuators, wherein the pilot control is configured to generate the electrical signal.

In an aspect, a method of redundant flight control is provided. The method includes generating, by a pilot control, an electrical signal. The method includes receiving, by a plurality of actuators connected to an aerodynamic surface of an electric aircraft, the electrical signal, wherein the plurality of actuators comprises a first actuator and a second actuator that each comprise at least an electric motor configured to convert the electrical signal into a mechanical movement of the aerodynamic surface. The method includes moving, by the second actuator, the aerodynamic surface if the first actuator is disabled.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
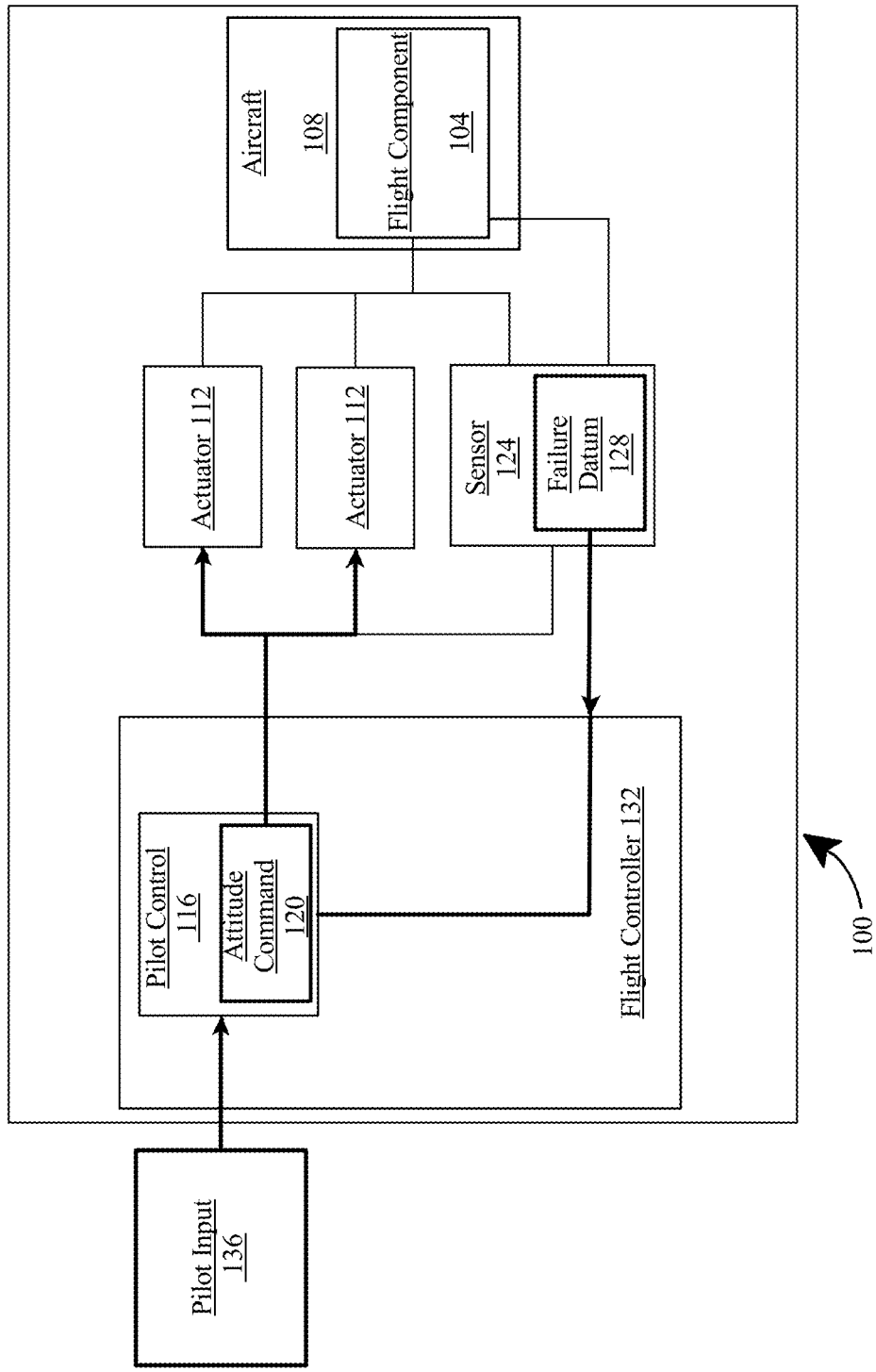
FIG. 1 is a block diagram illustrating an embodiment of a system for redundant flight control configured for use in an aircraft in accordance with aspects of the invention.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for redundant flight control configured for use in an aircraft. Aspects of the present disclosure can be used to enable the safe maneuvering of an aircraft during situations where there is a failure of an actuator needed to move a flight component to continue and execute the expected flight plan. Catastrophic failure of an actuator may result in the loss of control or breakup of an airframe and loss of life.

In the following description, for purposes of explanation, numerous details are set forth in order to provide understanding of the present invention. It will be apparent, however, that the present invention may be practiced without these specific details. As used in this disclosure, the word "exemplary" or "illustrative" means "serving as an example, instance, or illustration." Any implementation described in this disclosure as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description in this disclosure, the terms "up", "down", "left", "right", and derivatives thereof shall relate to the invention as oriented in FIG. 3. Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed in this disclosure are not to be considered as limiting, unless the claims expressly state otherwise.

"Communicatively connected", for the purposes of this disclosure, is a process whereby one device, component, or circuit is able to receive data from and/or transmit data to another device, component, or circuit. Communicative connection may be performed by wired or wireless electronic communication, either directly or by way of one or more intervening devices or components. In an embodiment, communicative connection includes electrically connection an output of one device, component, or circuit to an input of another device, component, or circuit. Communicative connection may be performed via a bus or other facility for intercommunication between elements of a computing device. Communicative connection may include indirect connections via "wireless" connection, low power wide area network, radio communication, optical communication, magnetic, capacitive, or optical connection, or the like. In an embodiment, communicative connecting may include electrically connecting an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical connection, or the like.

A "flight component" as described in this disclosure, is any aerodynamic surface attached to an aircraft and that interacts with forces to move the aircraft. A flight component may include, as a non-limiting example, ailerons, flaps, leading edge flaps, rudders, elevators, spoilers, slats, blades, stabilizers, stabilators, airfoils, a combination thereof, or any other moveable surface used to control an aircraft in a fluid medium.

Referring now to FIG. 1, an exemplary embodiment of a system 100 for redundant flight control configured for use in an aircraft is introduced. System 100 includes a flight component 104 attached to an aircraft 108, where a movement of flight component 104 is configured to adjust the attitude of aircraft 108. In one or more embodiments, system 100 includes a plurality of actuators 112 (also referred to in this disclosure as "actuators"), which includes a first actuator 112 and a second actuator 112. Each of first actuator 112 and second actuator 112 is attached to flight component 104 and configured to move flight component 104.

As understood by one skilled in the art, though actuators 112 are discussed as a pair of actuators, any number of actuators greater than one may be used to provide redundant flight control of an aircraft.

Figure 2A:
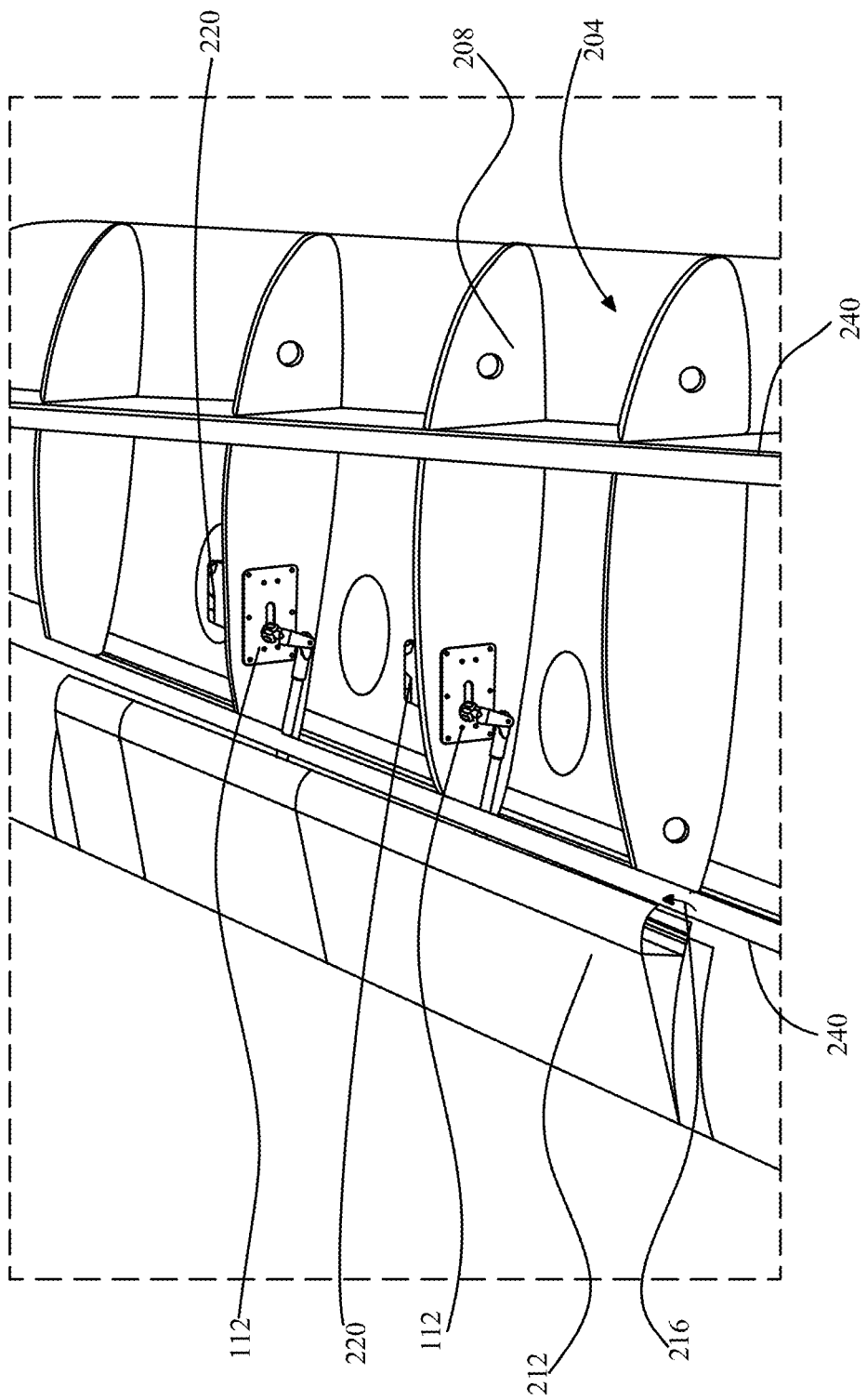
FIGS. 2A-2D are various diagrammatic representations of exemplary actuators in use in an aircraft in accordance with aspects of the invention.
Figure 2B:
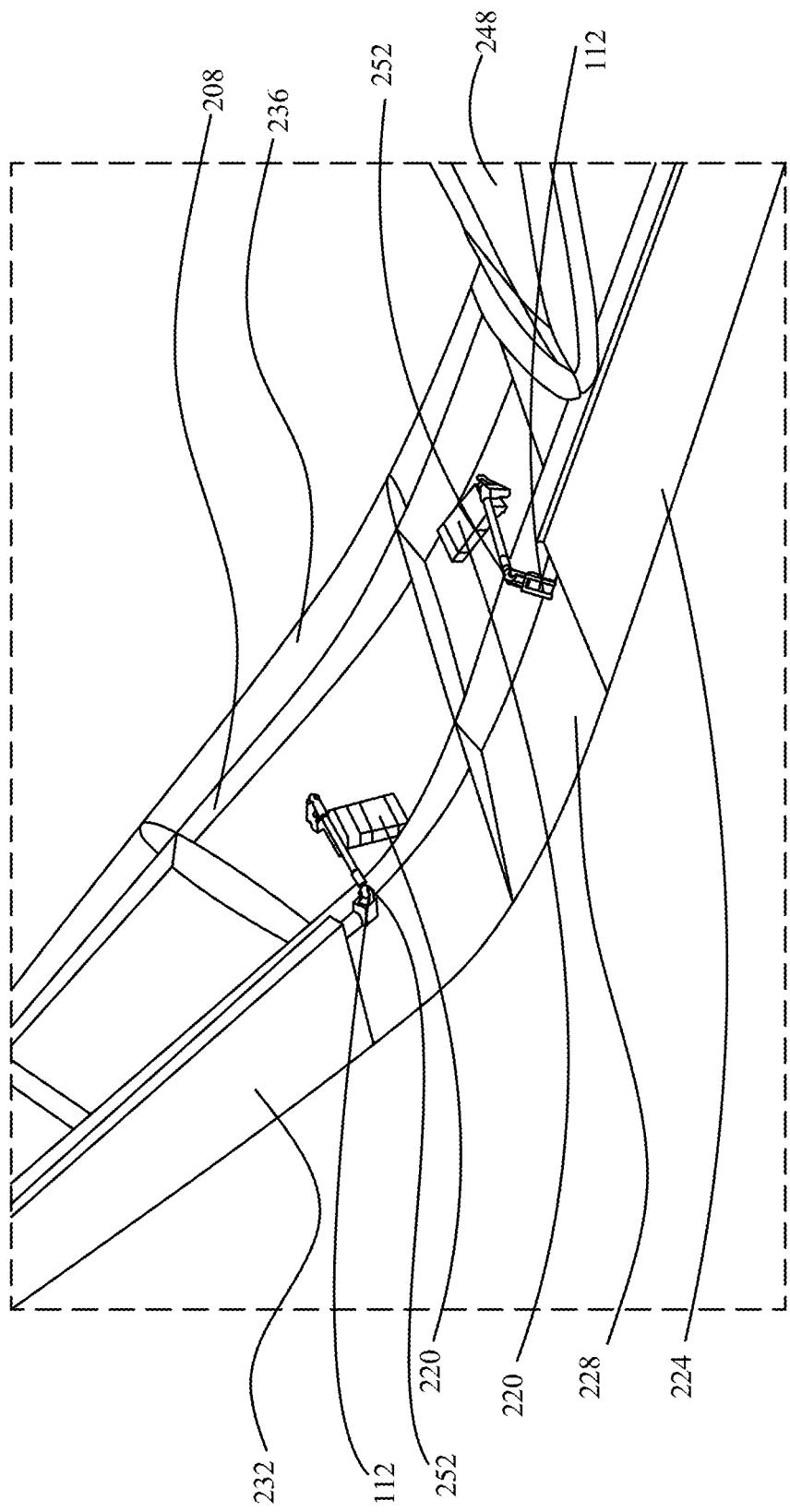
Figure 2C:
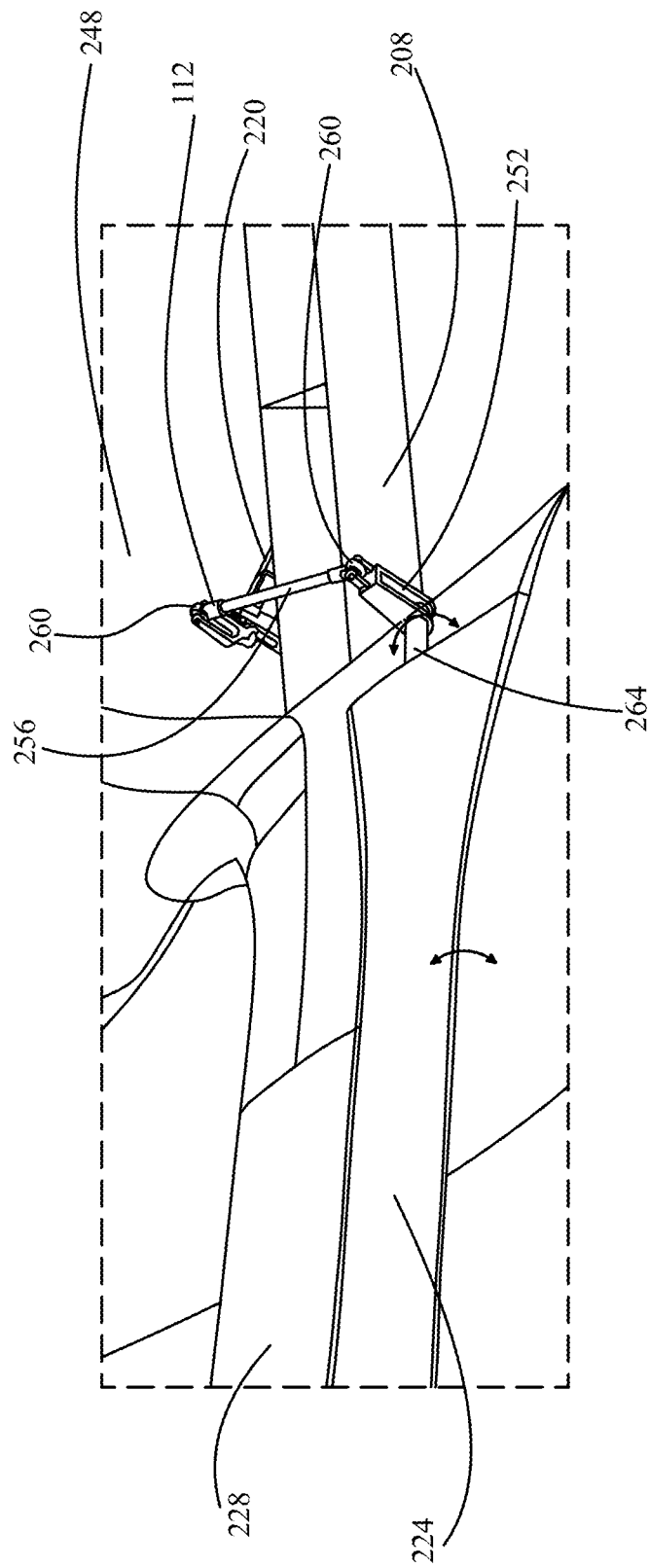

In one or more embodiments, actuators 112 may include pneumatic pistons, hydraulic pistons, and/or solenoid pistons. In other embodiments, actuators 112 may use electrical components. For example, as shown in FIGS. 2A-2C, actuators 112 may each include a hydraulic piston that extends or retracts to actuate flight component 104. In another example, actuators 112 may each include a solenoid. Similarly, actuators 112 may be triggered by electrical power, pneumatic pressure, hydraulic pressure, or the like. Actuators 112 may also include electrical motors, servomotors, cables, and the like, as discussed further below.

With continued reference to FIG. 1, system 100 also includes a pilot control 116 communicatively connected to each actuator 112 and configured to generate an attitude command 120 to the plurality of actuators 112. Pilot control 116 may include a pilot interfacing component. The pilot interfacing component may be an inceptor stick, collective pitch control, brake pedals, pedal controls, steering wheel, throttle lever, toggles, joystick, or control wheel. One of ordinary skill in the art, upon reading the entirety of this disclosure would appreciate the variety of input controls that may be present in an aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Additionally, or alternatively, pilot input 136 may include one or more data sources providing raw data. "Raw data", for the purposes of this disclosure, is data representative of aircraft information that has not been conditioned, manipulated, or processed in a manner that renders data unrepresentative of aircraft information. In exemplary embodiments, pilot input 136 may be provided by a pilot or an automation system. Pilot input 136 may be exterior sensor data, interior sensor data, data retrieved from one or more remotely or onboard computing devices. Pilot input 136 may include audiovisual data, pilot voice data, biometric data, or a combination thereof. Pilot input 136 may include information or raw data gathered from gyroscopes, inertial measurement units (IMUs), motion sensors, a combination thereof, or another sensor or grouping of sensors. Pilot control 116 may be physically located in the cockpit of aircraft 108 or remotely located outside of aircraft 108 in another location communicatively connected to at least a portion of aircraft 108.

In one or more embodiments, one actuator 112 is able to move flight component 104 if the other actuator 112 fails to move flight component 104 after receipt of attitude command 120 from pilot control 116. More specifically, second actuator 112 is able to move flight component 104 if first actuator 112 is disabled and fails to actuate. For instance, and without limitation, if the first actuator malfunctions, loses communication, or otherwise does not operate as intended, second actuator 112 may move flight component 104. Thus, actuators 112 are communicatively connected to receive data from pilot control 116 so that, if failure to actuate by one of actuators 112 is detected, the other actuator 112 actuates and moves flight component 104. For example, actuators 112 are communicatively connected to receive attitude command 120 from pilot control 116.

In one or more embodiments, actuators 112 may receive attitude command 120 from pilot control 116 and simultaneously actuate to move flight component 104 together. In other embodiments, only one actuator 112 may receive attitude command 120 to move flight component 104. For instance, and without limitation, first actuator 112 may receive attitude command 120 from pilot control 116 to move flight component 104. Then, if first actuator 112 fails to move flight component 104, second actuator 112 may move flight component 104, as discussed further in this disclosure. Actuators 112 may each include components, processors, computing devices, sensors, or the like. Actuators 112 may also include a computing device or plurality of computing devices consistent with the entirety of this disclosure. In one or more embodiments, pilot control 116 and/or actuators 112 may communicate with, receive commands from, and/or provide commands to flight controller 132, as discussed further below.

In reference still to FIG. 1, system 100 may include a sensor 124 that is communicatively connected to pilot control 116 and plurality of actuators 112. Sensor 124 may be attached to aircraft 108 or to actuators 112, as discussed further disclosure. In one or more embodiments, sensor 124 is configured to detect attitude command 120 from pilot control 116, detect disablement of first actuator 112, and generate a failure datum 128 corresponding to the disablement. In one or more embodiments, pilot control 116 is configured to receive failure datum 128 from sensor 124 and, subsequently, generate attitude command 120 to second actuator 112 to move flight component 104 accordingly.

In one or more embodiments, sensor 124 may be configured to time all communication between first actuator 112, second actuator 112, and pilot control 116. Sensor 124 may detect that pilot control 116 has transmitted attitude command 120 to first actuator 112 and that flight component 104 has not moved in response to attitude command 120. As a result, sensor 124 may determine first actuator 112 is disabled and, thus, communicate to pilot control 116 and/or flight controller 132 that first actuator 112 is disabled. As a result, flight controller 132 may alert, for example, a pilot of the disablement and transmit a signal to second actuator 112 to actuate accordingly to move flight component 104. Though sensor 124 is described as being attached to aircraft 108 and communicating with each actuator 112, as understood by one skilled in the art, in other embodiments, each actuator 112 may include a sensor.

In other embodiments, plurality of actuators 112 may simultaneously receive attitude command 120 and both actuate in response to move flight component 104. However, if first actuator 112 is disabled, sensor 124 is configured to detect the disablement and transmit failure datum 128 to pilot control 116 and to second actuator 112 so that second actuator 112 may adjust its operation accordingly. For example, second actuator 112 may, for example, increase power or torque to compensate for the failure of first actuator 112 so that flight component 104 moves as if first actuator 112 and second actuator 112 are operational.

Sensors, as described in this disclosure, are any device, module, and/or subsystems, utilizing any hardware, software, and/or any combination thereof to detect events and/or changes in the instant environment and communicate the information to the vehicle controller. Sensor 124 may be mechanically and/or communicatively connected, as described above, to aircraft 108. Sensor 124 may be configured to detect failure datum 128 of actuators 112. Sensor 124 may be incorporated into aircraft 108 or be remote. As an example and without limitation, sensor 124 may be configured to detect disablement of one or more of the plurality of actuators 112 and generate failure datum 128 accordingly. Failure datum 128 may include, without limitation, an element of data identifying and/or describing a disablement of one or more of the plurality of actuators 112. In an embodiment, sensor 124 may detect that flight component 104 did not move despite a pilot input 136 into pilot control 116 and, thus, generate failure datum 128 in response. Failure datum 128 may include, as an example and without limitation, a determination that first actuator 112 is operating insufficiently, such as, for example, if first actuator 112 has been damaged or has lost communication.

In one or more embodiments, sensor 124 may include, as an example and without limitation, an environmental sensor. As used herein, an environmental sensor may be used to detect ambient temperature, barometric pressure, air velocity, motion sensors which may include gyroscopes, accelerometers, inertial measurement unit (IMU), various magnetic, humidity, and/or oxygen. As another non-limiting example, sensor 124 may include a geospatial sensor. As used in this disclosure, a geospatial sensor may include optical/radar/Lidar, GPS, and may be used to detect aircraft location, aircraft speed, aircraft altitude and whether the aircraft is on the correct location of the flight plan. Sensor 124 may be located inside aircraft 108. Sensor 124 may be inside a component of aircraft 108. In an embodiment, an environmental sensor may sense one or more environmental conditions or parameters outside the aircraft, inside the aircraft, or within or at any component thereof, including without limitation an energy source, a propulsor, or the like. The environmental sensor may further collect environmental information from the predetermined landing site, such as ambient temperature, barometric pressure, air velocity, motion sensors which may include gyroscopes, accelerometers, inertial measurement unit (IMU), various magnetic, humidity, and/or oxygen. The information may be collected from outside databases and/or information services, such as Aviation Weather Information Services. Sensor 124 may detect an environmental parameter, a temperature, a barometric pressure, a location parameter, and/or other necessary measurements. Sensor 124 may detect voltage, current, or other electrical connection via a direct method or by calculation. This may be accomplished, for instance, using an analog-to-digital converter, one or more comparators, or any other components usable to detect electrical parameters using an electrical connection that may occur to any person skilled in the art upon reviewing the entirety of this disclosure. Persons skilled in the art, upon reviewing the entirety of this disclosure, will be aware of various ways to monitor the status of the system of both critical and non-critical functions.

With continued reference to FIG. 1, flight controller 132 may be configured to receive an electrical parameter of actuators 112 from sensor 124. Such as, without limitation, flight controller 132 may be configured to receive failure datum 128 of actuators 112 from sensor 124. The electrical parameter of actuators 112 is any electrical parameter, as described in this disclosure. Flight controller 132 may be further configured to determine, using the electrical parameter, a power-production capability of the electrical energy source. Power-production capability, as described herein, is a capability to deliver power and/or energy to a load or component powered by an electrical energy source. A power-production capability may include a power delivery capability. As an example and without limitation, power delivery capability may include peak power output capability, average power output capability, a duration of time during which a given power level may be maintained, and/or a time at which a given power level may be delivered, including without limitation a peak and/or average power output capability. The time is provided in terms of a measurement of time in seconds and/or other units from a given moment, a measure of time in seconds and/or other units from a given point in a flight plan, or as a given point in a flight plan, such as, without limitation, a time when power may be provided may be rendered as a time at which an aircraft arrives at a particular stage in a flight plan. As an example and without limitation, power-production capability may indicate whether peak power may be provided at or during a landing stage of flight. Power-production capability may include, as a further example and without limitation, energy delivery capability, such as a total amount of remaining energy deliverable by a given electrical energy source, as well as one or more factors such as time, temperature, or rate that may affect the total amount of energy available. As a non-limiting example, circumstances that increase output impedance and/or resistance of an electrical energy source, and thus help determine in practical terms how much energy may actually be delivered to components, may be a part of energy delivery capability.

In one or more embodiments, sensor 124 may be a plurality of sensors incorporated in system 100 and/or aircraft 108. The plurality of sensors may be designed to detect a plurality of electrical parameters or environmental data in-flight, for instance as described above. The plurality of sensors may, as a non-limiting example, include a voltage sensor, wherein the voltage sensor is designed and configured to detect the voltage of one or more energy sources of aircraft 108 and/or actuators 112. As a further-non-limiting example, the plurality of sensors may include a current sensor, wherein the current sensor is designed and configured to detect the current of one or more energy sources of aircraft 108 and/or actuators 112. As a further non-limiting example, the plurality of sensors may include a temperature sensor, wherein the temperature sensor is designed and configured to detect the temperature of one or more energy sources of aircraft 108 and/or actuators 112. As a further non-limiting example, a plurality of sensors may include a resistance sensor, wherein the resistance sensor is designed and configured to detect the resistance of one or more energy sources of aircraft 108 and/or actuators 112. As another non-limiting example, a plurality of sensors may include an environmental sensor, wherein the environmental sensor may be designed and configured to detect a plurality of environmental data including, without limitation, ambient air temperature, barometric pressure, turbulence, and the like. The environmental sensor may be designed and configured, without limitation, to detect geospatial data to determine the location and altitude of the aircraft by any location method including, without limitation, GPS, optical, satellite, lidar, radar. The environmental sensor, as an example and without limitation, may be designed and configured to detect at a least a parameter of the motor. For example, environmental sensor may be designed and configured to detect motor of aircraft 108 or motor 220 of each actuator 112. The environmental sensor may be designed and configured, without limitation, to detect at a least a parameter of flight components 104. Sensor datum collected in flight, by sensors as described in this disclosure, may be transmitted to flight controller 132 and/or pilot control 116 and may be used to calculate the power output capacity of an energy source and/or projected energy needs of aircraft 108 during flight.

In one or more embodiments, pilot control 116 may include a processor configured to receive failure datum 128 from sensor 124. In one or more embodiments, pilot control 116 includes a pilot interfacing component. In one or more embodiments, pilot control 116 may communicate with the pilot interfacing component. In one or more exemplary embodiments, pilot interfacing component may be an inceptor, collective, foot brake, throttle lever, or control wheel. In one or more embodiments, pilot control 116 may also include buttons, switches, or other binary inputs in addition to, or alternatively than digital controls about which a plurality of inputs may be received. In one or more embodiments, pilot control 116 may be implemented as a flight controller, such as flight controller 132, as described in further detail in this disclosure.

Pilot control 116 is configured to receive pilot input 136. Pilot input 136 may include a physical manipulation of a control, such as a pilot using a hand and arm to push or pull a lever, or a pilot using a finger to manipulate a switch. Pilot input 136 may include a voice command by a pilot to a microphone and computing system consistent with the entirety of this disclosure. Pilot control 116 is configured to generate an attitude command 120 as a function of pilot input 136. Pilot control 116 may be communicatively connected to any other component presented in system 100. The communicative connections may include redundant connections configured to safeguard against single-point failure. Pilot control 116 may include circuitry, computing devices, electronic components, or a combination thereof that translate pilot input 136 into at least an electronic signal, such as attitude command 120, configured to be transmitted to another electronic component.

Attitude command 120 may indicate a pilot's desire to change the heading or trim of an aircraft. "Attitude command", for the purposes of this disclosure, refers to at least an element of data identifying a pilot input and/or command. Attitude command 120 may indicate a pilot's desire to change an aircraft's pitch, roll, or yaw. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. Attitude command 120 may be an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

With continued reference to FIG. 1, pilot control 116 may be a mechanical and/or electrical component that causes actuators 112 to operate. In one or more embodiments, flight controller 132 may be communicatively connected to pilot control 116. For example, pilot control 116 may be controlled by flight controller 132. In another example, pilot control 116 may be a component of flight controller 132 (as shown in in FIG. 1). In other embodiments, pilot control 116 may be flight controller 132. "Flight controller", for the purposes of this disclosure, refers to a component or grouping of components that control trajectory of the aircraft by taking in signals from a pilot and output signals to at least a propulsor and other portions of the aircraft, such as flight components, to adjust trajectory. Flight controller 132 may mix, refine, adjust, redirect, combine, separate, or perform other types of signal operations to translate pilot desired trajectory into aircraft maneuvers. Flight controller 132, for example, may take in pilot input 136 of moving an inceptor stick of pilot control 116. The signal from that move may be sent to flight controller 132, which performs any number or combinations of operations on those signals, then sends out output signals to any number of aircraft components that work in tandem or independently to maneuver the aircraft in response to the pilot input. Flight controller 132 may condition signals such that they can be sent and received by various components throughout aircraft 108.

Flight controller 132 may be designed and/or configured to perform any method, method step, or sequence of method steps in any embodiment described in this disclosure, in any order and with any degree of repetition. For instance, flight controller 132 may be configured to perform a single step or sequence repeatedly until a desired or commanded outcome is achieved. Repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 132 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing. Flight controller 132, as well as any other components or combination of components, may be connected to a controller area network (CAN), which may interconnect all components for signal transmission and reception.

Additionally, flight controller 132 may include and/or communicate with any computing device, including without limitation a microcontroller, microprocessor, digital signal processor (DSP), and/or system on a chip (SoC). Flight controller 132 may be programmed to operate aircraft to perform at least a flight maneuver. At least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 132 may be designed and configured to operate the aircraft via fly-by-wire. Flight controller 132 is communicatively connected to each actuator 112 and, thus, each flight component 104. As a non-limiting example, flight controller 132 may transmit signals to actuators 112 via an electrical circuit connecting flight controller 132 to actuators 112. The circuit may include a direct conductive path from flight controller 132 to actuators 112 or may include an isolated connection such as an optical or inductive connection. Alternatively, or additionally, flight controller 132 may communicate flight using wireless communication, such as without limitation communication performed using electromagnetic radiation including optical and/or radio communication, or communication via magnetic or capacitive connection. Flight controller 132 may be fully incorporated in an aircraft and may be a remote device operating the aircraft remotely via wireless or radio signals, or may be a combination thereof, such as a computing device in the aircraft configured to perform some steps or actions described in this disclosure while a remote device is configured to perform other steps. Persons skilled in the art will be aware, after reviewing the entirety of this disclosure, of many different forms and protocols of communication that may be used to communicatively connect flight controller 132 to actuators 112.

Flight controller 132 may interface or communicate with one or more additional devices as described below in further detail via a network interface device. Network interface device may be utilized for connecting flight controller 132 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 132 may include but is not limited to, for example, a computing device or cluster of computing devices in a first location and a second computing device or cluster of computing devices in a second location. System 100 may include one or more computing devices dedicated to data storage, security, distribution of traffic for load balancing, and the like. Flight controller 132 may distribute one or more computing tasks as described below across a plurality of computing devices of computing device, which may operate in parallel, in series, redundantly, or in any other manner used for distribution of tasks or memory between computing devices. Flight controller 132 may be implemented using a "shared nothing" architecture in which data is cached at the worker, in an embodiment, this may enable scalability of flight controller 132 and/or computing device.

FIGS. 2A-2D show various partially transparent views of exemplary embodiments of actuators 112 of an exemplary aircraft 248. FIG. 2A shows an exemplary embodiment of system 100 where actuators 112 are disposed within a wing 204 of aircraft 248 and attached to a portion of an airframe 208 of aircraft 248. Actuators 112 are also attached to aileron 212 so as to actuate movement of aileron 212. For example, as indicate by directional arrow 216, at least a portion of aileron 212 may be moved up or down relative to aircraft 248. Actuators 112 are each configured to move flight component 104 of aircraft 108 as a function of received attitude command 120 (shown in FIG. 1). Attitude command 120 indicates a desired change in aircraft attitude, as described in this disclosure.

In one or more exemplary embodiments, flight controller 132 and/or pilot control 116 is configured to generate attitude command 120 as a function of pilot input 136. For example, flight controller 132 may be configured to translate pilot input 136 using pilot control 116, in the form of moving an inceptor stick, for example, into electrical signals to actuators 112 that in turn, move flight component 104 of aircraft 108 in a way that manipulates a fluid medium, like air, to accomplish the pilot's desired maneuver. Attitude command 120 may be an electrical signal configured to be transmitted to at least a portion of aircraft 108, namely plurality of actuators 112, which are each attached to flight component 104 of aircraft 108 so that flight component 104 may manipulate a fluid medium to change the pitch, roll, yaw, or throttle of aircraft 108 when moved. In one or more embodiments, actuators 112 may include a conversion mechanism configured to convert the electrical signal from pilot control 116 to a mechanical movement of flight component 104. In one or more exemplary embodiments, actuators 112 may each include a piston and cylinder system configured to utilize hydraulic pressure to extend and retract a piston connected to at least a portion of aircraft 108.

In one or more embodiments, actuators 112 may each include a motor 220, as shown in FIGS. 2A-2C. For example, actuators 112 may each include a stepper motor or servomotor configured to utilize electrical energy into electromagnetic movement of a rotor in a stator. Actuators 112 may each include a system of gears attached to an electric motor configured to convert electrical energy into kinetic energy and mechanical movement through a system of gears. Motor 220 may be connected to an energy source. Motor 220 may be electrically connected to an inverter. Motor 220 may be powered by alternating current produced by the inverter. Each motor 220 may be operatively connected to each actuator 112. Motor 220 may operate to move one or more flight components 104, to drive one or more propulsors, or the like. Motor 220 may be driven by direct current (DC) electric power and may include, without limitation, brushless DC electric motors, switched reluctance motors, induction motors, or any combination thereof. A motor may also include electronic speed controllers, inverters, or other components for regulating motor speed, rotation direction, and/or dynamic braking.

In one or more embodiments, each actuator 112 may be attached to flight component 104. Each actuator 112 may be fixed, pivotally connected, or slidably connected to flight component 104. For example, actuator 112 may be pivotally connected to flight component 104 using a pivot joint, such as pivot joint 252 shown in FIGS. 2B-2D. In an exemplary embodiment, pivot joint 252 may be connected to a protrusion, such as protrusion 264, of flight component 104. When flight component is moved by one or more of actuators 112, flight component 104 may be rotated about a longitudinal axis of protrusion 264 such that at least a portion of flight component 104 is raised or lowered relative to outer-mold-lines (OML) 240 of aircraft 248 or raised or lowered to be flush with OML 240 of aircraft 248. Pivot joint may be a ball and socket joint, a condyloid joint, a saddle joint, a pin joint, pivot joint, a hinge joint, or a combination thereof. The pivot joint may allow for movement along a single axis or multiple axes. Actuators 112 may also include a rod 256, which directly or indirectly connects pivot joint 252 to motor 220. Rod 256 may have a rod end 260 that is connected to pivot joint 252. In one or more embodiments, rod 256 may be directly connected to motor 220 or connected to motor 220 via, for example, additional pivot joints.

With continued reference to FIG. 2A-2D, actuators 112 each have a primary mode wherein each actuator 112 is configured to move flight component 104 of aircraft 108 as a function of attitude command 120 received from pilot control 116. Actuators 112 are configured to move flight component 104 of aircraft 108 in one or both of the two main modes of locomotion of flight component 104. For instance, without limitation, flight component 104 may be lifted, pivoted, or slid relative to OML 240 of aircraft 248 by actuators 112. For example, as shown in FIG. 2A, aileron 212 may be moved up or down relative to aircraft 108 (as indicated by directional arrow 216) by actuators 112. In another example, an elevator 224 of a horizontal stabilizer 228 may be moved up or down relative to aircraft 248 by actuators 112, as shown in FIGS. 2B and 2C. In another example, a rudder 232 of a vertical stabilizer 236 may be moved left or right relative to aircraft 248 by actuators 112, as shown in FIG. 2B. The electronic signals from pilot control 116 or flight controller 132 may be translated to flight component 104. For instance, without limitation, attitude command 120 from pilot control 116 or flight controller 132 may be translated to flight component 104. In one or more embodiments, flight component 104 includes an aerodynamic surface. In one or more exemplary embodiments, the aerodynamic surface may be an aileron, an edge slat, an elevator, a rudder, balance and anti-balance tabs, flaps, spoilers, a trim, or a mass balance.

Figure 2D:
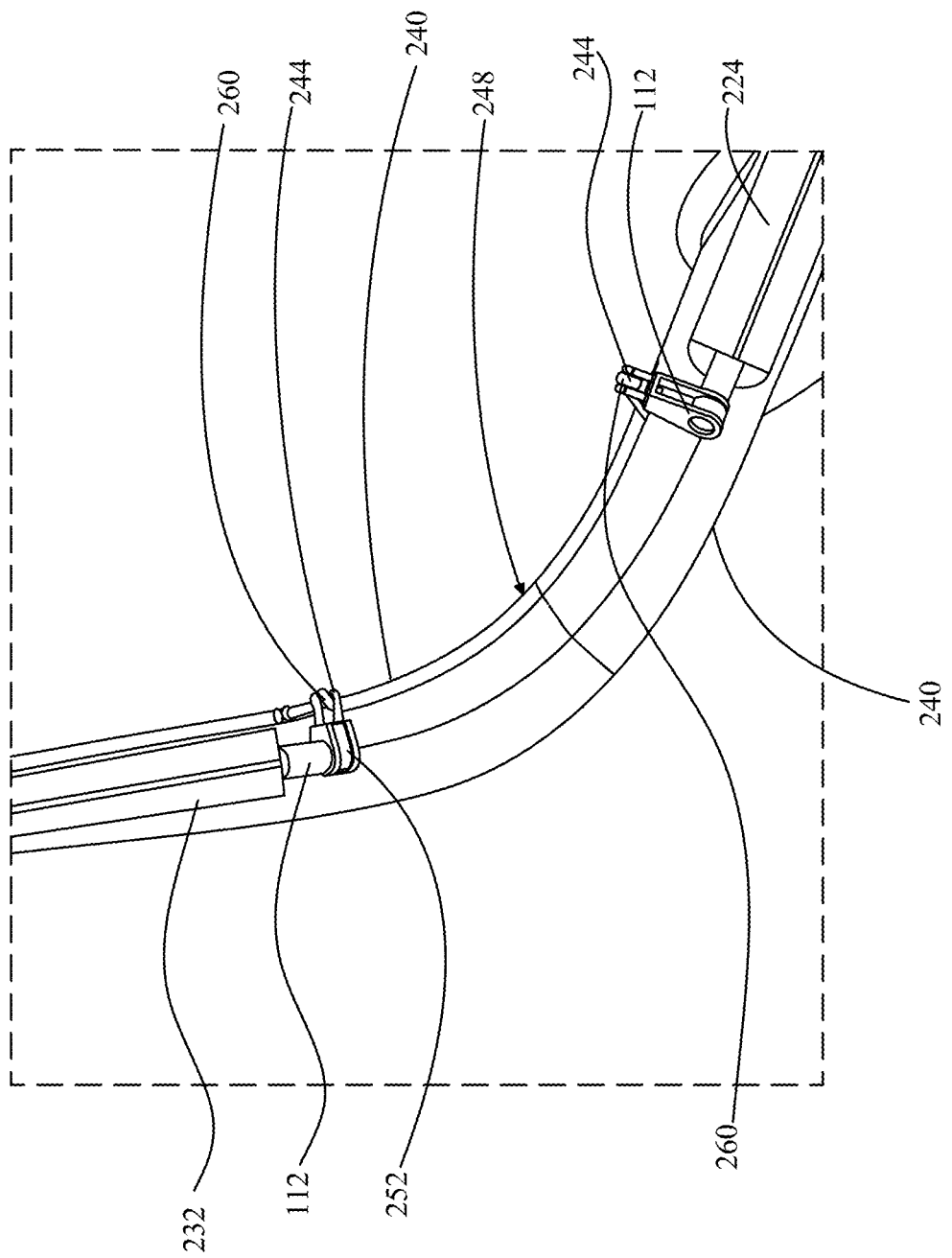

In one or more embodiments, at least one of plurality of actuators 112 is enclosed in an outer-mold-lines (OML) 240 of aircraft 108, as shown in FIGS. 2A-2C. In other embodiments, at least a portion 244 of at least one of plurality of actuators 112 protrudes through OML 240 of aircraft 248, as shown in FIG. 2D. Furthermore, protruding portion 244 of at least one plurality of actuators 112 may be oriented relative to the OML so as to minimize drag.

Figure 3:
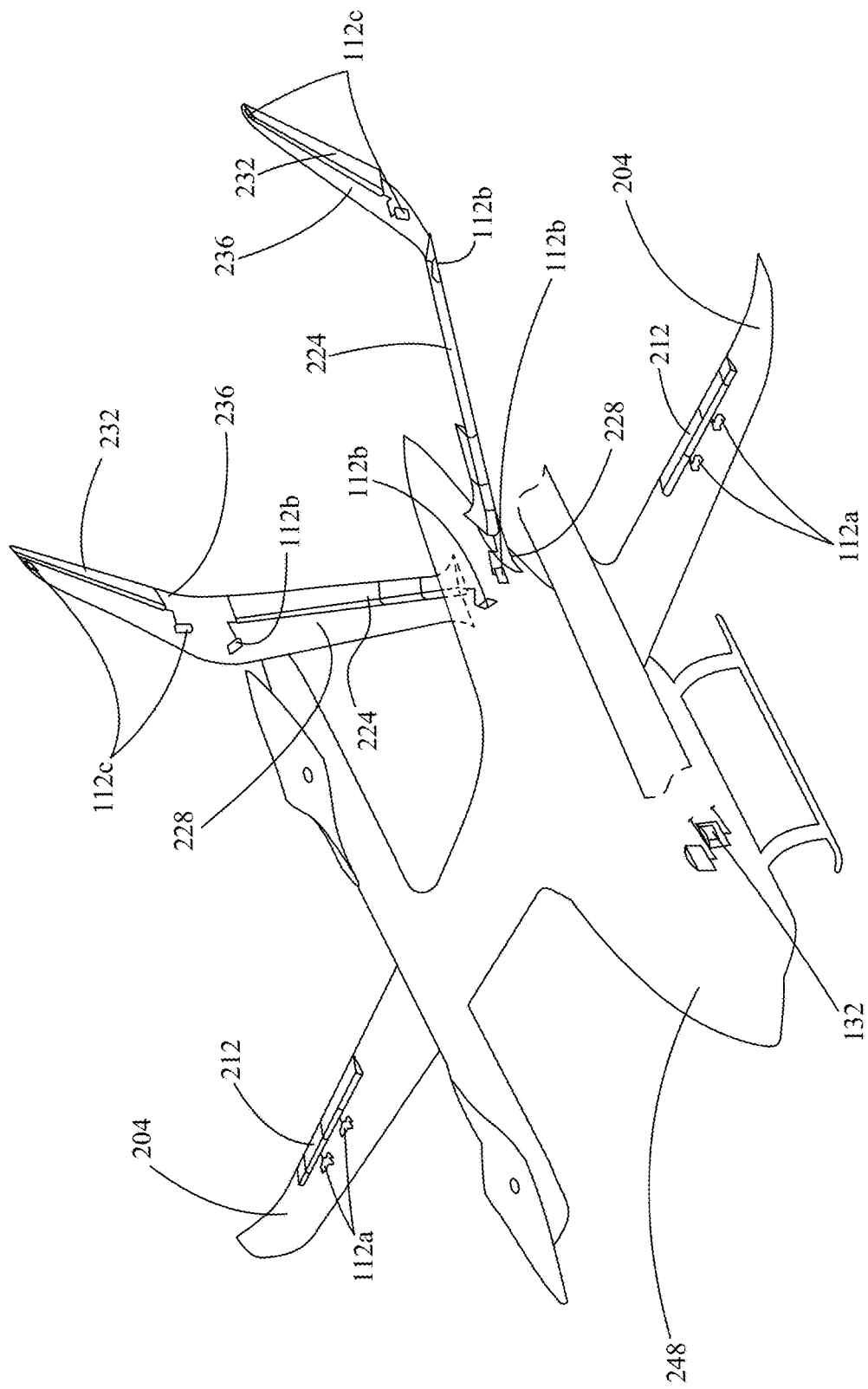
FIG. 3 is a diagrammatic representation of an exemplary aircraft in accordance with aspects of the invention.

FIG. 3 shows exemplary aircraft 248 with multiple pluralities of actuators 112a-c located in various locations and attached to various flight components 104 of aircraft 248. For example, plurality of actuators 112a are attached to and move ailerons 212 of wings 204. Plurality of actuators 112b are attached and move elevators 224 of horizontal stabilizers 228. Plurality of ailerons 112c are each attached to rudders 232 of vertical stabilizers 236. Though only two actuators are shown in each plurality of actuators 112a-c, more than two actuators may be used in each plurality of actuators 112a-c without changing the scope of the invention, as understood by one skilled on the art.

In one or more embodiments, aircraft 248 may be an electric aircraft. The electric aircraft may include a vertical takeoff and landing aircraft (eVTOL). As used in this disclosure, a vertical take-off and landing (eVTOL) aircraft is one that can hover, take off, and land vertically.

Figure 4:
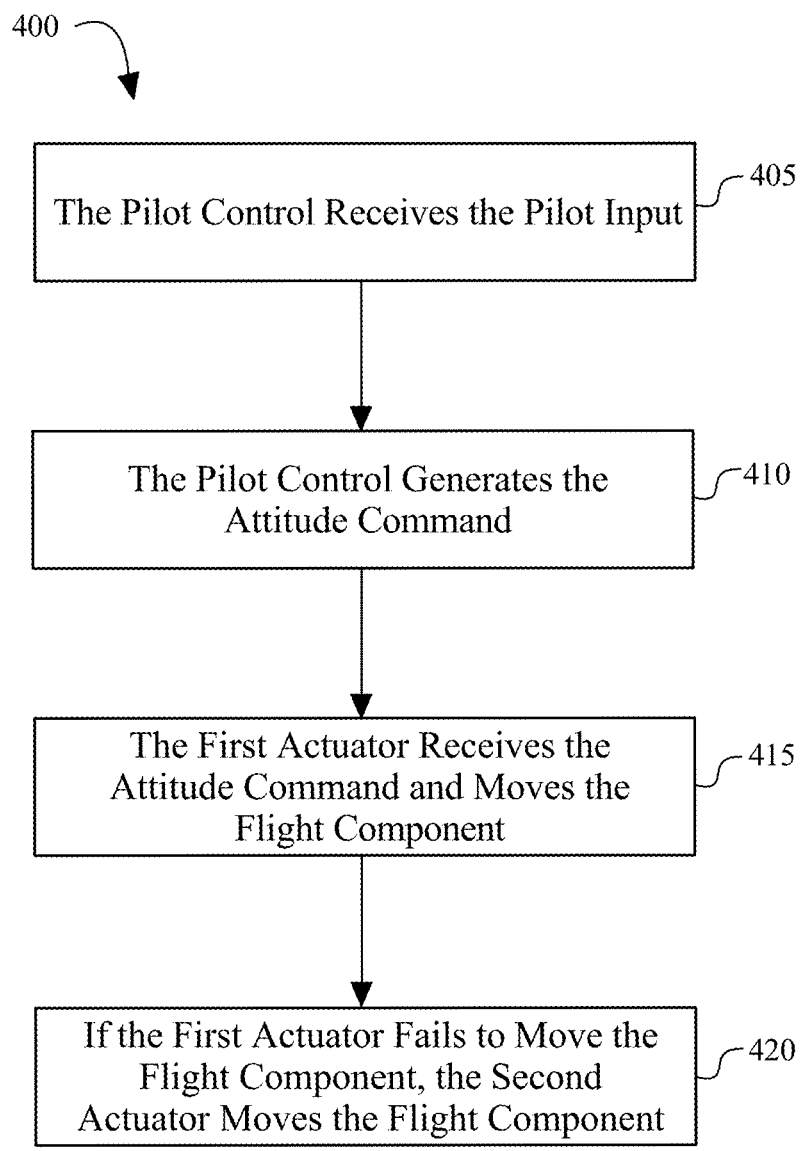
FIG. 4 is a flow diagram illustrating a method of redundant flight control in accordance with aspects of the invention.

Referring now to FIG. 4, a method 400 of redundant flight control in an aircraft is presented in flow chart form. At 405, pilot control 116 receives pilot input 136. For example, pilot control 116 may be communicatively connected to flight controller 132. Furthermore, pilot control 116 may be communicatively connected to actuators 112.

At 410, pilot control 116 generates an attitude command as a function of pilot input 136. The attitude command 120 may include an electrical signal. Attitude command 120 may be any attitude command as described in this disclosure, and the electrical signal may be any electrical signal as described in this disclosure. In one or more embodiments, flight controller 132 may receive the electrical signal from pilot control 116 and generate attitude command 120. Flight controller 132 may be any flight controller as described in this disclosure.

At 415, first actuator 112 receives attitude command 120 and moves flight component 104 accordingly. Alternatively, at 420, second actuator 112 moves flight component 104 if first actuator 112 is disabled. If first actuator 112 is disabled, first actuator 112 will not be operational and fail to move flight component 104.

In one or more embodiments, the step of generating attitude command 120 may include the providing of sensor 124, which detects attitude command 120. Sensor 124 may generate failure datum 128 in response to detection of disablement of first actuator 112. Pilot control 116 may receive failure datum 128 from sensor 124. Subsequently, pilot control 116 may generate attitude command 120 to second actuator 112. As a result of receiving attitude command 120, second actuator 112 moves flight component 104. In one or more embodiments, the step of moving flight component 104 includes converting, by second actuator 112, attitude command 120 to a mechanical signal.

It is to be noted that any one or more of the aspects and embodiments described in this disclosure may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described in this disclosure. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used in this disclosure, is intended to include a single medium as well as a collection of physically separate media, such as, for example, a collection of compact discs or one or more hard disk drives in combination with a computer memory. As used in this disclosure, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described in this disclosure.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
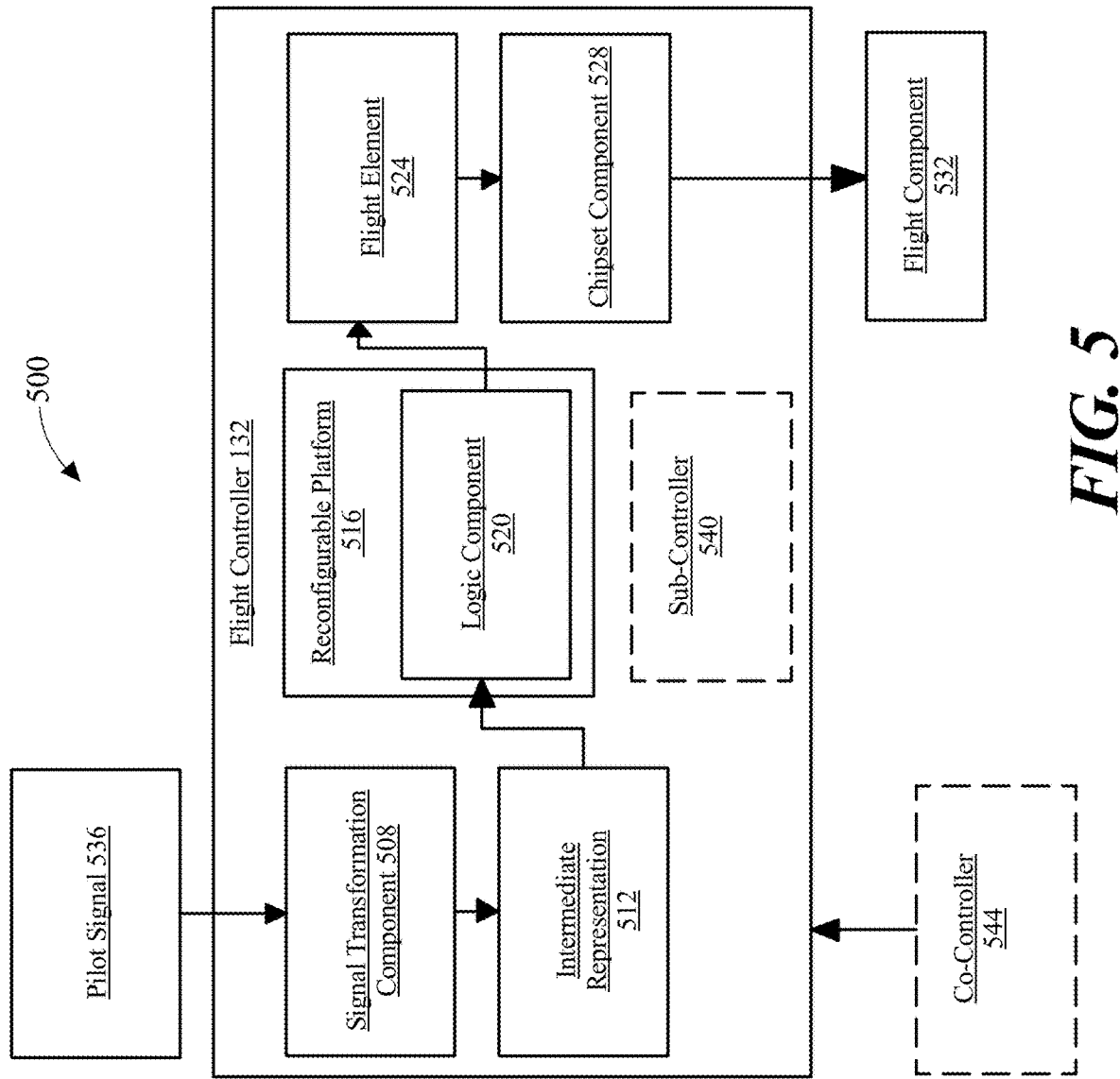
FIG. 5 is a block diagram illustrating an exemplary flight controller in accordance with aspects of the invention.

Now referring to FIG. 5, an exemplary embodiment of flight controller 132 is illustrated. As used in this disclosure a "flight controller" is a computing device of a plurality of computing devices dedicated to data storage, security, distribution of traffic for load balancing, and flight instruction. Flight controller 132 may include and/or communicate with any computing device as described in this disclosure, including and without limitation a microcontroller, microprocessor, digital signal processor (DSP) and/or system on a chip (SoC) as described in this disclosure. Further, flight controller 132 may include a single computing device operating independently, or may include two or more computing device operating in concert, in parallel, sequentially or the like; two or more computing devices may be included together in a single computing device or in two or more computing devices. In embodiments, flight controller 132 may be installed in an aircraft, may control the aircraft remotely, and/or may include an element installed in the aircraft and a remote element in communication therewith.

In an embodiment, and still referring to FIG. 5, flight controller 132 may include a signal transformation component 508. As used in this disclosure a "signal transformation component" is a component that transforms and/or converts a first signal to a second signal, wherein a signal may include one or more digital and/or analog signals. For example, and without limitation, signal transformation component 508 may be configured to perform one or more operations such as preprocessing, lexical analysis, parsing, semantic analysis, and the like thereof. In an embodiment, and without limitation, signal transformation component 508 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 508 may include transforming one or more low-level languages such as, but not limited to, machine languages and/or assembly languages. For example, and without limitation, signal transformation component 508 may include transforming a binary language signal to an assembly language signal. In an embodiment, and without limitation, signal transformation component 508 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 5, signal transformation component 508 may be configured to optimize an intermediate representation 512. As used in this disclosure an "intermediate representation" is a data structure and/or code that represents the input signal. Signal transformation component 508 may optimize intermediate representation as a function of a data-flow analysis, dependence analysis, alias analysis, pointer analysis, escape analysis, and the like thereof. In an embodiment, and without limitation, signal transformation component 508 may optimize intermediate representation 512 as a function of one or more inline expansions, dead code eliminations, constant propagation, loop transformations, and/or automatic parallelization functions. In another embodiment, signal transformation component 508 may optimize intermediate representation as a function of a machine dependent optimization such as a peephole optimization, wherein a peephole optimization may rewrite short sequences of code into more efficient sequences of code. Signal transformation component 508 may optimize intermediate representation to generate an output language, wherein an "output language," as used herein, is the native machine language of flight controller 132. For example, and without limitation, native machine language may include one or more binary and/or numerical languages.

In an embodiment, and without limitation, signal transformation component 508 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 5, flight controller 132 may include a reconfigurable hardware platform 516. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 516 may be reconfigured to enact any algorithm and/or algorithm selection process received from another computing device and/or created using machine-learning processes.

Still referring to FIG. 5, reconfigurable hardware platform 516 may include a logic component 520. As used in this disclosure a "logic component" is a component that executes instructions on output language. For example, and without limitation, logic component may perform basic arithmetic, logic, controlling, input/output operations, and the like thereof. Logic component 520 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 520 may be organized according to Von Neumann and/or Harvard architecture as a non-limiting example. Logic component 520 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 520 may include one or more integrated circuit microprocessors, which may contain one or more central processing units, central processors, and/or main processors, on a single metal-oxide-semiconductor chip. Logic component 520 may be configured to execute a sequence of stored instructions to be performed on the output language and/or intermediate representation 512. Logic component 520 may be configured to fetch and/or retrieve the instruction from a memory cache, wherein a "memory cache," as used in this disclosure, is a stored instruction set on flight controller 132. Logic component 520 may be configured to decode the instruction retrieved from the memory cache to opcodes and/or operands. Logic component 520 may be configured to execute the instruction on intermediate representation 512 and/or output language. For example, and without limitation, logic component 520 may be configured to execute an addition operation on intermediate representation 512 and/or output language.

In an embodiment, and without limitation, logic component 520 may be configured to calculate a flight element 524. As used in this disclosure a "flight element" is an element of datum denoting a relative status of aircraft. For example, and without limitation, flight element 524 may denote one or more torques, thrusts, airspeed velocities, forces, altitudes, groundspeed velocities, directions during flight, directions facing, forces, orientations, and the like thereof. For example, and without limitation, flight element 524 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 524 may denote that aircraft is following a flight path accurately and/or sufficiently.

Still referring to FIG. 5, flight controller 132 may include a chipset component 528. As used in this disclosure a "chipset component" is a component that manages data flow. In an embodiment, and without limitation, chipset component 528 may include a northbridge data flow path, wherein the northbridge dataflow path may manage data flow from logic component 520 to a high-speed device and/or component, such as a RAM, graphics controller, and the like thereof. In another embodiment, and without limitation, chipset component 528 may include a southbridge data flow path, wherein the southbridge dataflow path may manage data flow from logic component 520 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 528 may manage data flow between logic component 520, memory cache, and a flight component 532. As used in this disclosure, a "flight component" is a portion of an aircraft that can be moved or adjusted to affect one or more flight elements. For example, flight component 532 may include a component used to affect the aircrafts' roll and pitch which may comprise one or more ailerons. As a further example, flight component 532 may include a rudder to control yaw of an aircraft. In an embodiment, chipset component 528 may be configured to communicate with a plurality of flight components as a function of flight element 524. For example, and without limitation, chipset component 528 may transmit to an aircraft rotor to reduce torque of a first lift propulsor and increase the forward thrust produced by a pusher component to perform a flight maneuver.

In an embodiment, and still referring to FIG. 5, flight controller 132 may be configured generate an autonomous function. As used in this disclosure an "autonomous function" is a mode and/or function of flight controller 132 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 524. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 132 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 132 will control the ailerons and/or rudders. As used in this disclosure "non-autonomous mode" is a mode that denotes a pilot will control aircraft and/or maneuvers of aircraft in its entirety.

In an embodiment, and still referring to FIG. 5, flight controller 132 may generate autonomous function as a function of an autonomous machine-learning model. As used in this disclosure an "autonomous machine-learning model" is a machine-learning model to produce an autonomous function output given flight element 524 and a pilot signal 536 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 536 may denote that a pilot is controlling and/or maneuvering ailerons, wherein the pilot is not in control of the rudders and/or propulsors. In an embodiment, pilot signal 536 may include an implicit signal and/or an explicit signal. For example, and without limitation, pilot signal 536 may include an explicit signal, wherein the pilot explicitly states there is a lack of control and/or desire for autonomous function. As a further non-limiting example, pilot signal 536 may include an explicit signal directing flight controller 132 to control and/or maintain a portion of aircraft, a portion of the flight plan, the entire aircraft, and/or the entire flight plan. As a further non-limiting example, pilot signal 536 may include an implicit signal, wherein flight controller 132 detects a lack of control such as by a malfunction, torque alteration, flight path deviation, and the like thereof. In an embodiment, and without limitation, pilot signal 536 may include one or more explicit signals to reduce torque, and/or one or more implicit signals that torque may be reduced due to reduction of airspeed velocity. In an embodiment, and without limitation, pilot signal 536 may include one or more local and/or global signals. For example, and without limitation, pilot signal 536 may include a local signal that is transmitted by a pilot and/or crew member. As a further non-limiting example, pilot signal 536 may include a global signal that is transmitted by air traffic control and/or one or more remote users that are in communication with the pilot of aircraft. In an embodiment, pilot signal 536 may be received as a function of a tri-state bus and/or multiplexor that denotes an explicit pilot signal should be transmitted prior to any implicit or global pilot signal.

Still referring to FIG. 5, autonomous machine-learning model may include one or more autonomous machine-learning processes such as supervised, unsupervised, or reinforcement machine-learning processes that flight controller 132 and/or a remote device may or may not use in the generation of autonomous function. As used in this disclosure "remote device" is an external device to flight controller 132. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 5, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 132 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 5, flight controller 132 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 132. Remote device and/or FPGA may transmit a signal, bit, datum, or parameter to flight controller 132 that at least relates to autonomous function. Additionally or alternatively, the remote device and/or FPGA may provide an updated machine-learning model. For example, and without limitation, an updated machine-learning model may be comprised of a firmware update, a software update, a autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 132 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 5, flight controller 132 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 5, flight controller 132 may include, but is not limited to, for example, a cluster of flight controllers in a first location and a second flight controller or cluster of flight controllers in a second location. Flight controller 132 may include one or more flight controllers dedicated to data storage, security, distribution of traffic for load balancing, and the like. Flight controller 132 may be configured to distribute one or more computing tasks as described below across a plurality of flight controllers, which may operate in parallel, in series, redundantly, or in any other manner used for distribution of tasks or memory between computing devices. For example, and without limitation, flight controller 132 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or softwares. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 5, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 532. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 5, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 132. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 512 and/or output language from logic component 520, wherein output language may include one or more analog-to-digital conversions, low bit rate transmissions, message encryptions, digital signals, binary signals, logic signals, analog signals, and the like thereof described above in detail.

Still referring to FIG. 5, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 5, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 5, flight controller 132 may also be implemented using a "shared nothing" architecture in which data is cached at the worker, in an embodiment, this may enable scalability of aircraft and/or computing device. Flight controller 132 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 5, flight controller may include a sub-controller 540. As used in this disclosure a "sub-controller" is a controller and/or component that is part of a distributed controller as described above; for instance, flight controller 132 may be and/or include a distributed flight controller made up of one or more sub-controllers. For example, and without limitation, sub-controller 540 may include any controllers and/or components thereof that are similar to distributed flight controller and/or flight controller as described above. Sub-controller 540 may include any component of any flight controller as described above. Sub-controller 540 may be implemented in any manner suitable for implementation of a flight controller as described above. As a further non-limiting example, sub-controller 540 may include one or more processors, logic components and/or computing devices capable of receiving, processing, and/or transmitting data across the distributed flight controller as described above. As a further non-limiting example, sub-controller 540 may include a controller that receives a signal from a first flight controller and/or first distributed flight controller component and transmits the signal to a plurality of additional sub-controllers and/or flight components.

Still referring to FIG. 5, flight controller may include a co-controller 544. As used in this disclosure a "co-controller" is a controller and/or component that joins flight controller 132 as components and/or nodes of a distributer flight controller as described above. For example, and without limitation, co-controller 544 may include one or more controllers and/or components that are similar to flight controller 132. As a further non-limiting example, co-controller 544 may include any controller and/or component that joins flight controller 132 to distributer flight controller. As a further non-limiting example, co-controller 544 may include one or more processors, logic components and/or computing devices capable of receiving, processing, and/or transmitting data to and/or from flight controller 132 to distributed flight control system. Co-controller 544 may include any component of any flight controller as described above. Co-controller 544 may be implemented in any manner suitable for implementation of a flight controller as described above.

In an embodiment, and with continued reference to FIG. 5, flight controller 132 may be designed and/or configured to perform any method, method step, or sequence of method steps in any embodiment described in this disclosure, in any order and with any degree of repetition. For instance, flight controller 132 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 6:
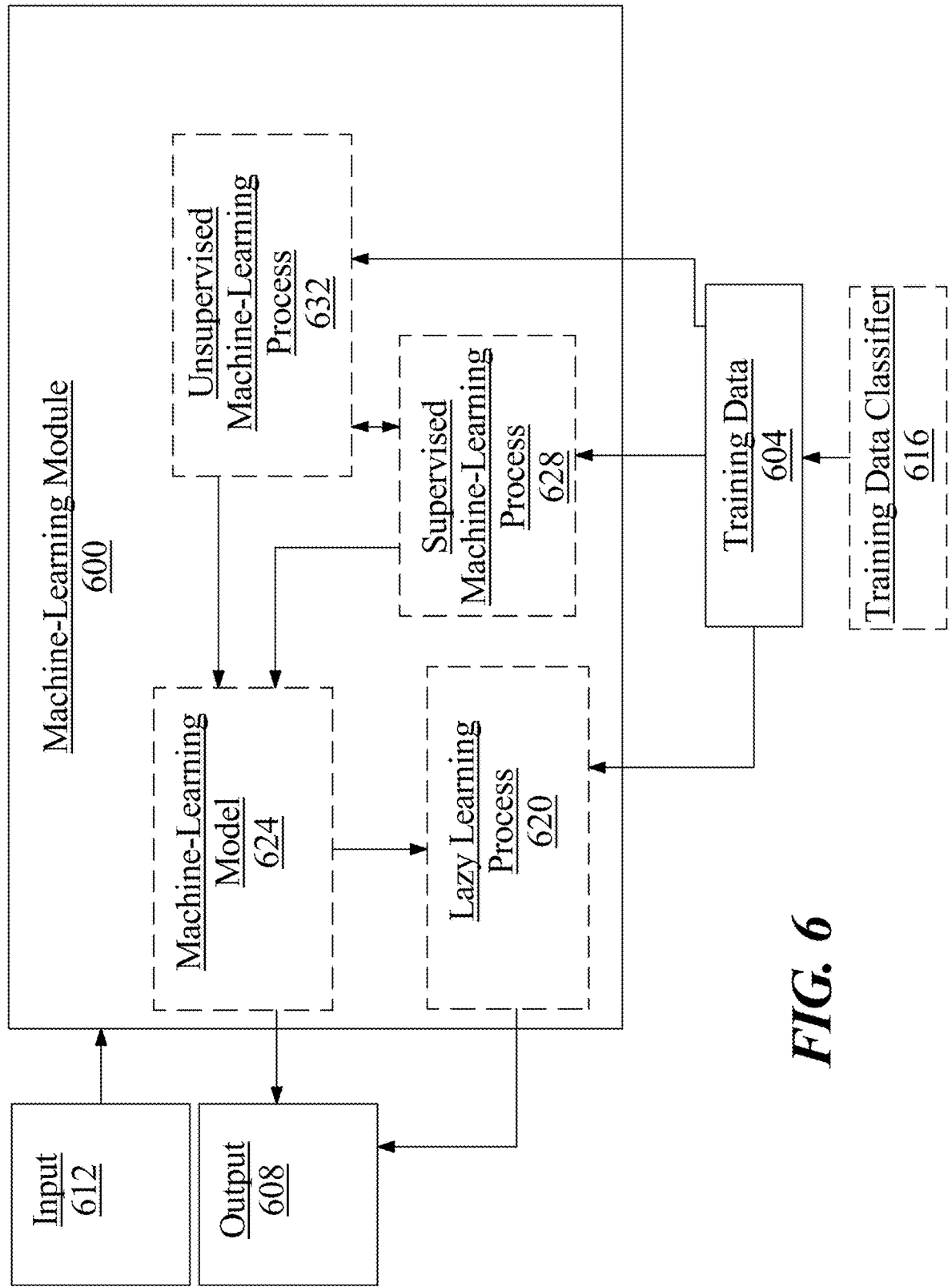
FIG. 6 is a block diagram illustrating an exemplary machine-learning module that can be used to implement any one or more of the methodologies disclosed in this disclosure and any one or more portions thereof in accordance with aspects of the invention.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm that will be performed by a computing device/module to produce outputs 608 given data provided as inputs 612; this is in contrast to a non-machine learning software program where the commands to be executed are determined in advance by a user and written in a programming language.

Still referring to FIG. 6, "training data," as used herein, is data containing correlations that a machine-learning process may use to model relationships between two or more categories of data elements. For instance, and without limitation, training data 604 may include a plurality of data entries, each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example flight elements and/or pilot signals may be inputs, wherein an output may be an autonomous function.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, machine-learning algorithms may include at least a supervised machine-learning process 628. At least a supervised machine-learning process 628, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 7:
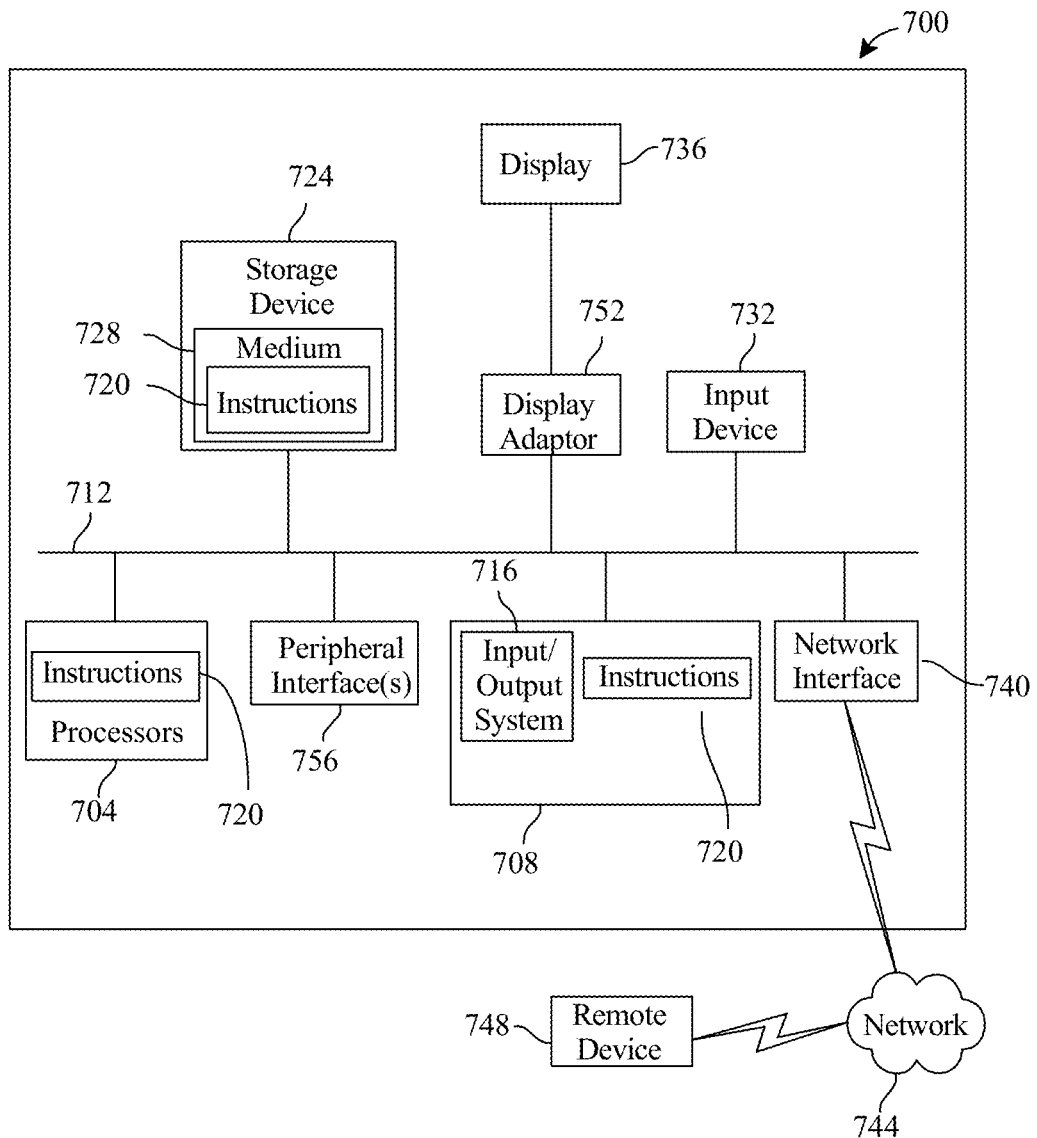
FIG. 7 is a block diagram of a computing system that can be used to implement any one or more of the methodologies disclosed in this disclosure and any one or more portions thereof in accordance with aspects of the invention.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described in this disclosure is merely illustrative of the application of the principles of the present invention. Additionally, although particular methods in this disclosure may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed in this disclosure without departing from the spirit and scope of the present invention.

What is claimed is:

1. A system for redundant flight control, the system comprising:
   an aerodynamic surface of an electric aircraft, wherein the aerodynamic surface is configured to adjust an attitude of the electric aircraft;
   a plurality of actuators comprising a first actuator and a second actuator, wherein:
   the first actuator comprises a first electric motor configured to convert an electrical signal into a first mechanical movement of the aerodynamic surface,
   the second actuator comprises a second electric motor configured to convert the electrical signal into a second mechanical movement of the aerodynamic surface based at least in part on receiving an alert from a flight controller,
   the alert represents that the first actuator is disabled, and
   the flight controller is configured to transmit the alert to the second actuator based at least in part on determining that the first actuator is disabled; and
   a pilot control communicatively connected to the flight controller, the pilot control configured to generate a pilot control signal, wherein the flight controller generates the electrical signal according to the pilot control signal.

2. The system of claim 1, wherein each of the first actuator and the second actuator comprises:
   a rod comprising a rod end, wherein the rod is connected to the first electric motor; and
   a pivot joint pivotally attached to the rod end and a protrusion of the aerodynamic surface.

3. The system of claim 2, wherein moving the aerodynamic surface comprises rotating the aerodynamic surface about a longitudinal axis of the protrusion such that at least a portion of the aerodynamic surface moves relative to an outer-mold-line (OML) of the electric aircraft.

4. The system of claim 2, wherein the pivot joint comprises a ball joint.

5. The system of claim 1, wherein the first actuator includes a rod that is coupled to the first electric motor.

6. The system of claim 1, wherein the pilot control comprises a pilot interfacing component.

7. The system of claim 6, wherein the pilot interfacing component comprises an inceptor stick.

8. The system of claim 1, wherein:
   the electrical signal comprises an attitude command; and
   the attitude command is generated based on a desired movement of the electric aircraft.

9. The system of claim 1, wherein the first electric motor comprises a servomotor.

10. The system of claim 1, wherein the first electric motor comprises a brushless direct current (DC) electric motor.

11. The system of claim 1, wherein the aircraft further comprises a vertical takeoff and landing (eVTOL) aircraft.

12. A method of redundant flight control, the method comprising:
    generating, by a flight controller, an electrical signal for controlling a position of an aerodynamic surface of an electric aircraft;
    determining, by a flight controller, that a first actuator associated with the aerodynamic surface is disabled; and
    based at least in part on determining that the first actuator is disabled, providing, by a flight controller, an alert to a second actuator associated with the aerodynamic surface, wherein the alert represents that the first actuator is disabled, and wherein the second actuator comprises an electric motor that is configured to, based at least in part on receiving the alert, convert the electrical signal into the aerodynamic surface.

13. The method of claim 12, wherein each of the first actuator and the second actuator comprises:
    a rod comprising a rod end, wherein the rod is connected to the electric motor; and a pivot joint pivotally attached to the rod end and a protrusion of the aerodynamic surface.

14. The method of claim 13, wherein moving the aerodynamic surface comprises rotating the aerodynamic surface about a longitudinal axis of the protrusion such that at least a portion of the aerodynamic surface moves relative to an outer-mold-line (OML) of the electric aircraft.

15. The method of claim 13, wherein the pivot joint comprises a ball joint.

16. The method of claim 12, wherein of the first actuator includes a rod that is coupled to the electric motor.

17. The method of claim 12, wherein the electric motor comprises a servomotor.

18. The method of claim 12, wherein:
the electrical signal comprises an attitude command; and
the attitude command is generated based on a desired movement of the electric aircraft.

19. The method of claim 12, wherein the electric aircraft comprises a pilot interfacing component.

20. The method of claim 12, wherein the aircraft comprises a vertical takeoff and landing (eVTOL) aircraft.

* * * * *